UNITED STATES PATENT OFFICE

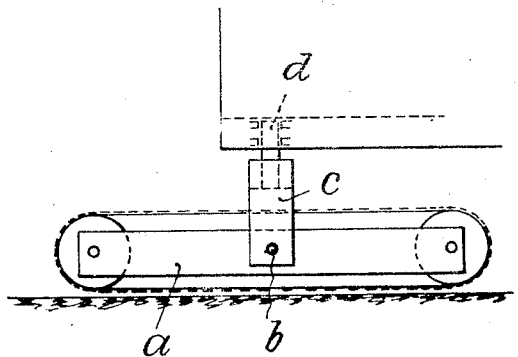
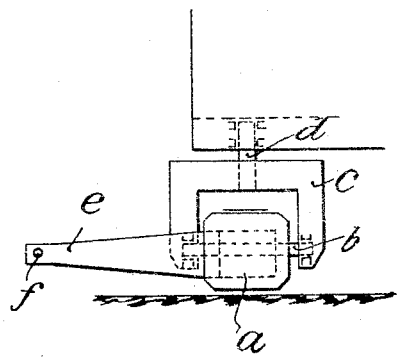
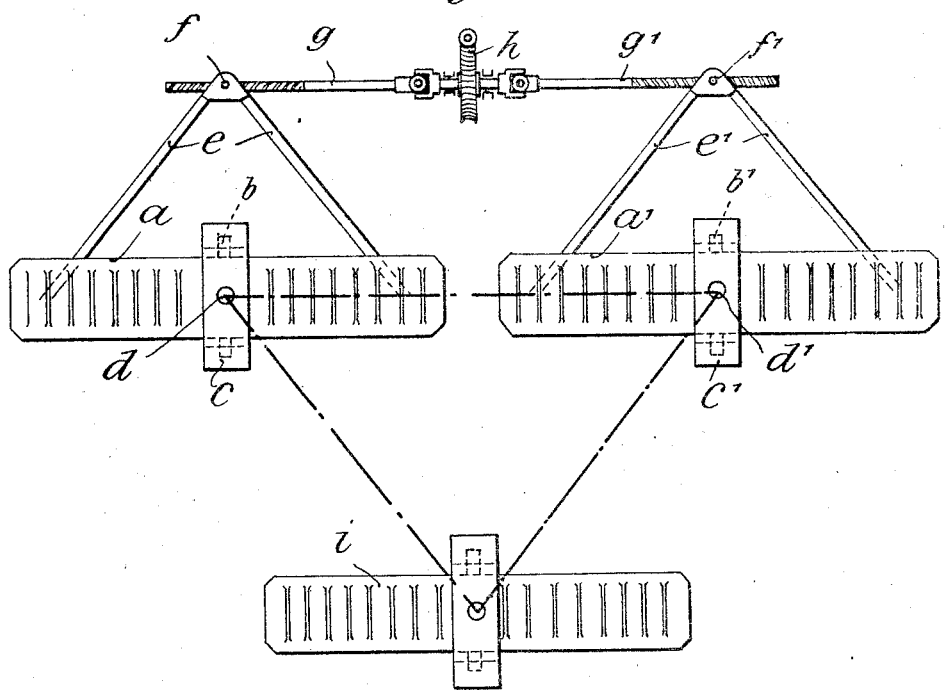

ADOLF LANGE, OF BERLIN, GERMANY, ASSIGNOR TO LUBECKER MASCHINENBAU-GESELLSCHAFT, OF LUBECK, GERMANY

STEERING DEVICE OF TRACK-CHAIN VEHICLES

Application filed October 19, 1928, Serial No. 313,571, and in Germany October 25, 1927.

My invention relates to so-called track-chain vehicles and more particularly to an improved steering device for use in connection with vehicles of the type referred to, and in which the steering is effected by turning the track-chains in a substantially horizontal plane.

Usually track-chain vehicles are controlled or steered by changing the running speed of the chains and if the track-chains are mounted in truck-like guiding frames, the chain and the frame are to be turned as a whole preferably by moving the frame by means of any appropriate source of power with the aid of a suitable shaft and gearing mechanism. As, however, vehicles of this type are mainly employed to run on uneven ground, in the vehicles as hitherto constructed or practised, the unevenness of the ground or road acts to change the direction in or during the operation of steering the truck-frame, due to the inclined position of the track-chain, so that it will be frequently impossible to correctly maintain the prescribed driving direction or course.

The object of the present invention is to overcome this disadvantage and with this object in view, the invention resides in the novel construction set forth in the following specification, particularly pointed out in the appended claims and illustrated in the accompanying drawings, it being understood that the right is reserved to embodiments other than that actually illustrated herein, to the full extent indicated by the general meaning of the terms in which the claims are expressed.

In the accompanying drawings forming a part of this specification, and showing for purposes of exemplification, a preferred form and manner in which the invention may be imbodied and practised, but without limiting the claimed invention to such illustrative instance:

Figure 1 is a diagrammatic side elevation of a track-chain truck-frame constructed in accordance with the present invention; Figure 2 is a front elevation thereof; and Figure 3 is a view in top plan of an arrangement including three track-chains whereof the two frames disposed in alinement and opposite the third frame, are adapted to be steered.

Referring to Figures 1 and 2, $a$ designates a track-chain with the shaft or axle $b$ journalled in bearings provided in the two depending shanks of a bridle $c$ adapted to turn about a suspended vertical pivot $d$. As will be seen in Figure 2, a laterally projecting cantilever-beam $e$ is firmly connected with the frame of the track-chain and equipped with an adjusting nut $f$ at the free end thereof. It will be seen in Figure 3, that the same constructional members so far described are provided in both the frame $a$ and the frame $a'$, constituting the two alined frames, the cantilever-beams and the adjusting nut of the frame $a'$ being denoted by $e'$ and $f'$ respectively.

The two adjusting nuts $f$ and $f'$ are interconnected by means of two rods $g$ and $g'$, respectively, and a short shaft interposed between the two rods is jointed therewith by universal joints. The outer ends of the two rods are threaded to engage in the two nuts $f$ and $f'$ respectively, and keyed to the short shaft is a worm-wheel $h$ adapted to co-operate with a worm, for receiving motion and transmitting the same to the two rods whereof the one has right-handed thread and the other one is left-handed, while the two nuts are correspondingly threaded. Motion may be imparted to the worm from any suitable source of power, perferably an electric motor (not shown). The third frame $i$ is not influenced by the described steering device.

The adjusting nuts $f$ and $f'$ are disposed at points, lying in the elongated axes of rotation $b$ and $b'$, respectively, in order that any oscillations or rotary movements of the track-chains about the said axes of rotation may not affect the action of the steering device.

In view of the foregoing, a detailed description of the operation of the steering device is deemed unnecessary and is therefore omitted in the interest of brevity.

What I claim is:—

1. A steering device of the character described, including in combination a plurality of track chain vehicles each including an oscillatory frame, and laterally projecting beams extending from certain of the frames, aligning steering and connecting rods universally connected to each other, relative motion effecting means between each of the rods and the adjacent beams and actuated at points intersecting the transverse axes on which the beam-carrying frames oscillate, and means for rotating the rods.

2. A steering device as claimed in claim 1, wherein the relative motion effecting means includes threads arranged at the outer ends of the rods and extending in opposite directions with respect to each other, and nuts mounted on the outer ends of the beams and engaging the threaded rods.

In testimony whereof I have signed my name to this specification.

ADOLF LANGE.